United States Patent
Prevot et al.

(10) Patent No.: US 6,439,413 B1
(45) Date of Patent: *Aug. 27, 2002

(54) HOT-FILLABLE AND RETORTABLE FLAT PANELED JAR

(75) Inventors: Roger M. Prevot, Felton; Robert Andrew Stewart, York; Jay Arnold, Landisville; Nicole Green, York, all of PA (US); Marvin Lee Smith, Alvaton, KY (US); Tracy Marie Momany, Sylvania, OH (US)

(73) Assignee: Graham Packaging Company, L.P., York, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/601,088

(22) PCT Filed: Feb. 29, 2000

(86) PCT No.: PCT/US00/05118

§ 371 (c)(1),
(2), (4) Date: Jul. 27, 2000

(87) PCT Pub. No.: WO00/51895

PCT Pub. Date: Sep. 8, 2000

(51) Int. Cl.[7] .............................................. B65D 90/02
(52) U.S. Cl. ........................ 215/381; 215/382; 220/669
(58) Field of Search ............................. 215/381, 382, 215/374–377, 379, 384; 220/600, 605, 609, 608, 623, 669, 674

(56) References Cited

U.S. PATENT DOCUMENTS

| | | | |
|---|---|---|---|
| 3,409,167 A | 11/1968 | Blanchard | |
| 3,870,181 A | * 3/1975 | Sincock | 215/1 C |
| 3,905,507 A | * 9/1975 | Lyu | 220/66 |
| 4,381,061 A | 4/1983 | Cerny et al. | 215/1 C |
| 4,642,968 A | 2/1987 | McHenry et al. | 53/425 |
| 4,667,454 A | 5/1987 | McHenry et al. | 53/425 |
| 4,735,339 A | 4/1988 | Benge et al. | 220/359 |
| 4,880,129 A | 11/1989 | McHenry et al. | 220/70 |
| 4,946,053 A | 8/1990 | Conrad | 215/1 C |
| 5,092,474 A | * 3/1992 | Leigner | 215/1 C |
| 5,141,120 A | 8/1992 | Brown et al. | 215/1 C |
| 5,141,121 A | 8/1992 | Brown et al. | 215/100 A |
| 5,199,587 A | * 4/1993 | Ota et al. | 215/1 C |
| 5,217,737 A | 6/1993 | Gygax et al. | 426/111 |
| 5,226,550 A | * 7/1993 | Mikolaitis et al. | 215/1 C |
| 5,234,126 A | 8/1993 | Jonas et al. | 220/609 |
| D339,291 S | 9/1993 | Leigner | D9/520 |
| 5,261,544 A | 11/1993 | Weaver, Jr. | 215/1 C |
| D344,457 S | 2/1994 | Prevot et al. | D9/537 |
| 5,392,937 A | 2/1995 | Prevot et al. | 215/1 C |
| 5,472,105 A | 12/1995 | Krishnakumar et al. | 215/384 |
| D370,850 S | 6/1996 | Beaver | D9/543 |
| 5,887,739 A | 3/1999 | Prevot et al. | 215/382 |
| 5,908,128 A | 6/1999 | Krishnakumar et al. | 215/381 |
| 5,971,184 A | 10/1999 | Krishnakumar et al. | 215/384 |
| D420,593 S | 2/2000 | Denner et al. | D9/520 |
| D423,936 S | 5/2000 | Smith et al. | D9/520 |
| D428,815 S | 8/2000 | Mooney et al. | D9/520 |
| D442,492 S | * 5/2001 | Krishnakumar et al. | D9/537 |

FOREIGN PATENT DOCUMENTS

| | | |
|---|---|---|
| EP | 469 777 | 2/1992 |
| WO | WO 97/03885 | 2/1997 |

* cited by examiner

*Primary Examiner*—Lee Young
*Assistant Examiner*—Lien Ngo
(74) *Attorney, Agent, or Firm*—Howson and Howson

(57) ABSTRACT

Hot-fillable, blow molded, wide-mouth plastic containers having a pair of flex panels (11, 111, 211) for accommodating thermally induced volumetric and pressure variations while affording easy contents scoopability, and desirable labeling features. The containers are capable of being blow-molded from injection molded preforms or from extruded parisons. The containers may be hot-filled and retorted. A desirable base (27, 127, 227) for a retortable container is also disclosed.

30 Claims, 12 Drawing Sheets

FIG.4
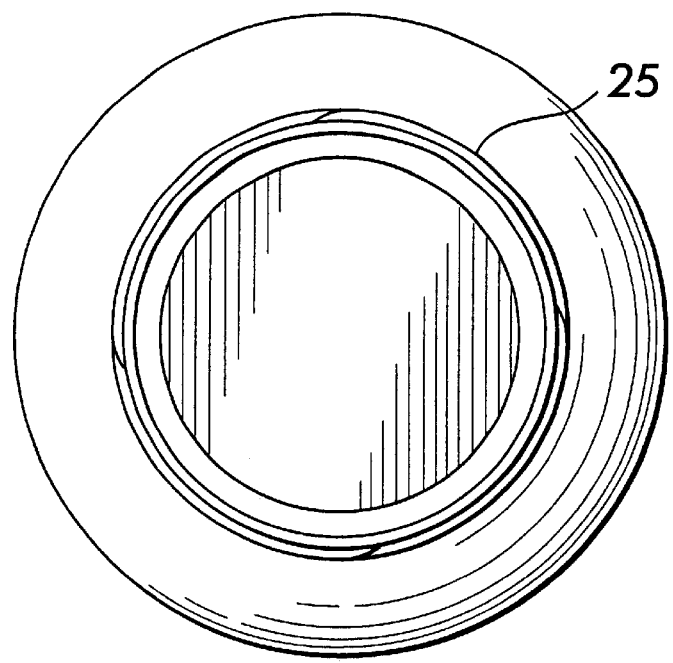
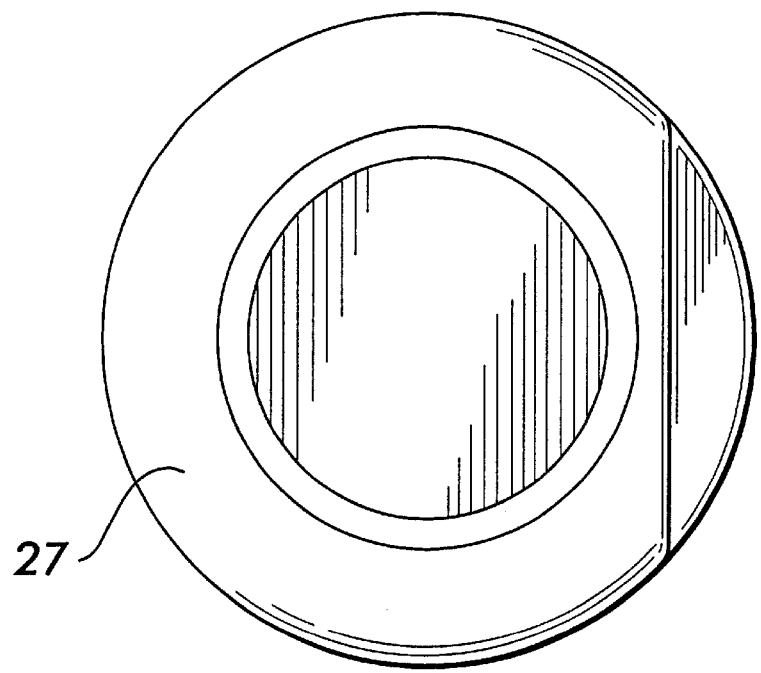
FIG.5

US 6,439,413 B1

HOT-FILLABLE AND RETORTABLE FLAT PANELED JAR

CROSS-REFERENCE TO RELATED APPLICATIONS

This is a 371 of PCT/US00/05118, which claims the benefit of the priority of U.S. patent application Ser. No. 60/122,317, filed Mar. 1, 1999 and U.S. patent application Ser. No. 60/142,177, filed Jul. 1, 1999.

FIELD OF THE INVENTION

The present invention relates to wide mouth blow molded plastic containers, and more particularly to such containers having opposed chordal vacuum flex panels which are particularly suited for hot-filling and/or retorting viscous products.

BACKGROUND OF THE INVENTION

A number of hot-fillable blow molded containers are disclosed having panels that flex due to the hot-filling process. For example, U.S. Patents to: Brown 5,141,120; Brown 5,141,121; Krishnakumar 5,472,105; Prevot 5,392,937; and Prevot D344,457 disclose hot-fillable bottles having panels providing the dual function of affording grippability and vacuum-accommodating flexure. U.S. Pat. No. 5,887,739, issued to Graham Packaging Company, L. P., and owned in common with the present application, discloses a blow-molded wide-mouth container having a plurality of vacuum-flex panels spaced apart about its periphery. U.S. Pat. No. D420,593, also owned by Graham, discloses a pinch-grip wide mouth container. While the patented Graham wide mouth containers afford the advantage of ready scoopability of contents, the flex panels and dome structural intrusions into the container may impede thorough scoopability for certain types of viscous food products. Unlike containers having conventional peripheral flex panels that afford wrap-around labeling, flex panel grip containers of the type disclosed in the above patents have limited labelable areas due to the presence of the unlabelable grip areas between the front and rear label panels.

In retort processing of containers filled with viscous products, such as sauces, the container is subjected to greater internal pressures and volumetric changes than occurs with hot-fill processing. This is due to the higher processing temperatures, and, therefore, the greater expansion of the contained products and associated vapor. In an attempt to provide a satisfactory retortable blow-molded plastic container, U.S. Pat. No. 4,642,968 discloses a cylindrical wide-mouth container having a bottom structure which bulges outwardly to accommodate internal forces developed during retorting. See also U.S. Pat. Nos. 5,217,737 and 5,234,126. U.S. Pat. No. 5,908,128 discloses a narrow-neck bottle having a plurality of peripheral flex panels that accommodate internal forces due to pasteurization. The '128 patent does not provide ready contents scoopability because it has a narrow neck and is encumbered with a plurality of internal flex panel structural elements that interfere with contents scooping.

There is, therefore, a need for a wide mouth container having a simple flex panel that presents a minimum of structure that can interfere with scooping of contents yet which is effective in absorbing vacuum without undesirable structural problems. There is also a need for such a container that provides a maximum amount of surface area for labeling. Furthermore, there is a need for a retortable wide mouth container that can be produced by economical extrusion blow-molding technology.

OBJECTS OF THE INVENTION

With the forgoing in mind, an object of the present invention is to provide novel hot fillable plastic containers which have vacuum absorption panels that flex during hot-filling, capping and cooling; which are resistant to unwanted distortion; and which have a minimum of internal structure that could impede thorough contents scooping.

Another object of the present invention is to provide wide-mouth, blow-molded jars having flat flex panels that present minimal interference with out-scooping of contents by a consumer and that maximize labelable areas.

A further object of the invention is to provide a wide-mouth, blow-molded jar structure that can be used in either hot-fill processing or in retort processing.

Yet another object of the invention is to provide a wide-mouth, blow-molded retortable jar that can be produced by conventional extrusion blow-molding technology.

BRIEF DESCRIPTION OF THE DRAWINGS

The foregoing and other objects, features and advantages of the invention should become apparent from the following detailed description when taken in conjunction with the accompanying drawings, in which:

FIG. 4 is a top plan view of the container shown in FIG. 1;

FIG. 5 is a bottom plan view of the container shown in FIG. 1;

DESCRIPTION OF THE PREFERRED EMBODIMENTS

Figure 1:
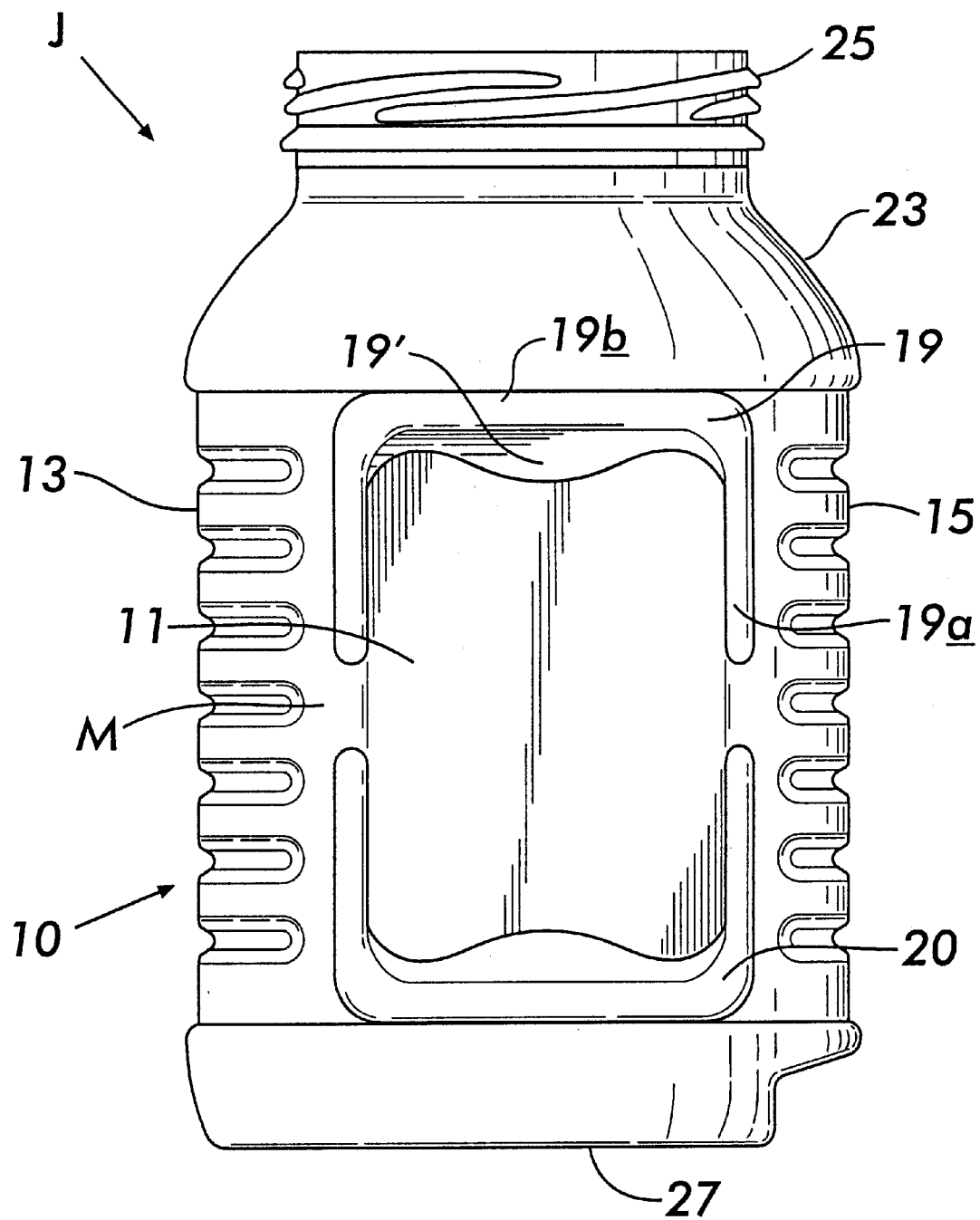
FIG. 1 is a side elevational view of one embodiment of a container according to the present invention, the opposite side elevational view being a mirror image thereof.
Figure 2:
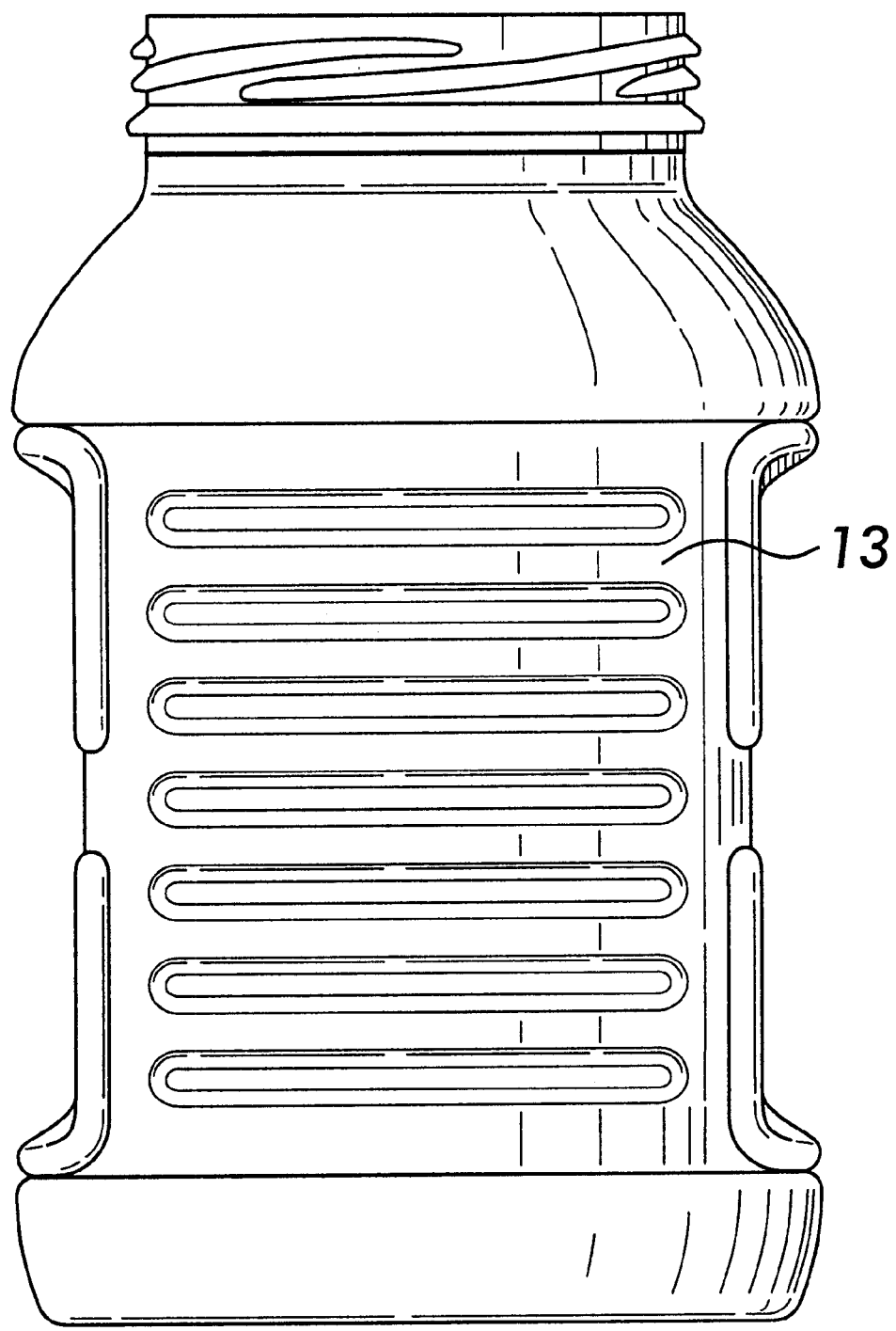
FIG. 2 is a front elevational view of the container shown in FIG. 1.
Figure 3:
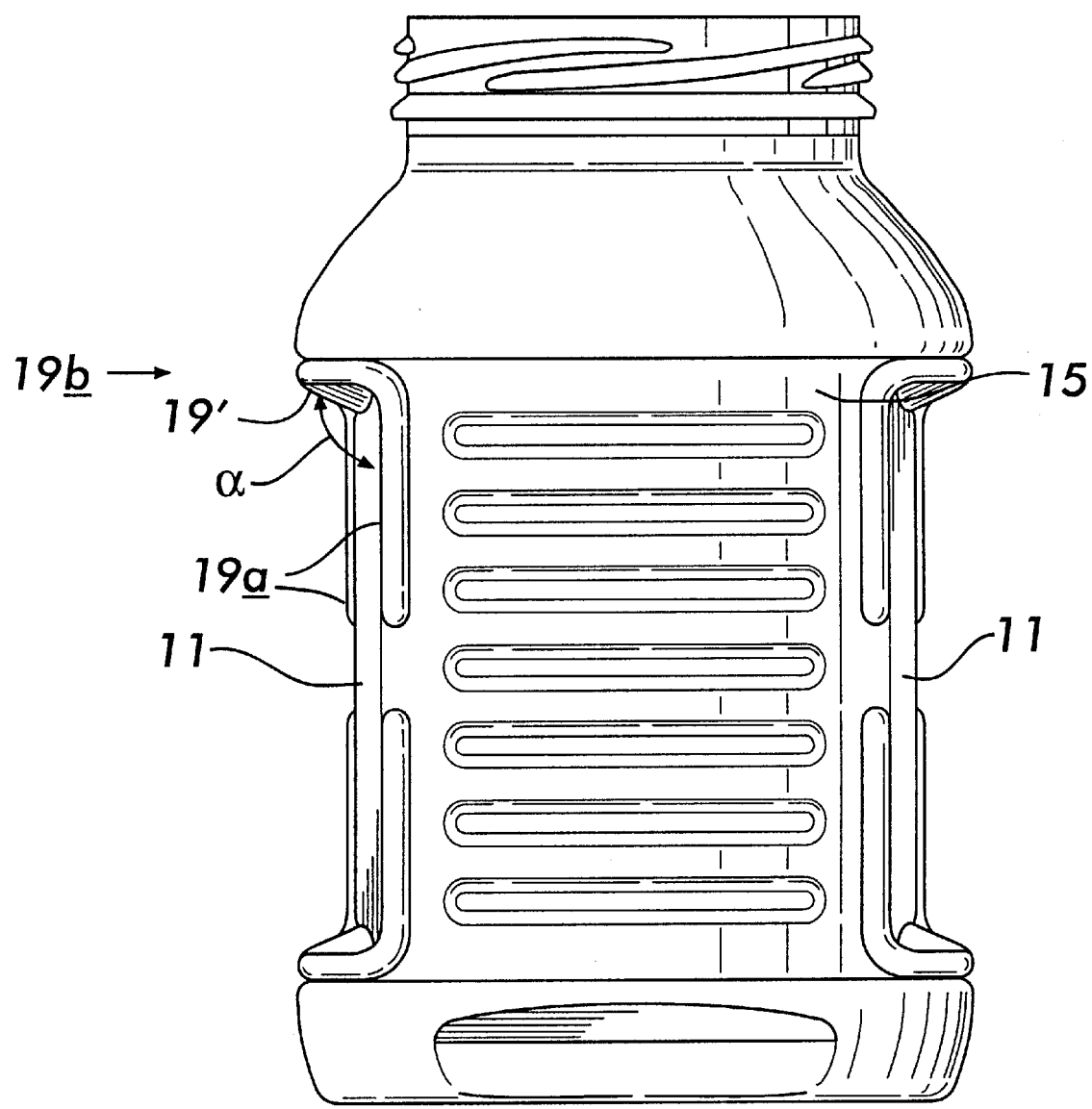
FIG. 3 is a rear elevational view of the container shown in FIG. 1.

As illustrated in FIG. 1, the present invention provides a blow molded, hot-fillable wide mouth jar J that has a body 10 with a pair of chordal vacuum flex panels 11 with flat outer surfaces situated as shown in FIGS. 2 and 3. The flex panels 11 are connected by an arcuate front label panel 13 and an arcuate rear label panel 15 of smaller arcuate extent than the front panel 13, so that the panels 11 are asymmetrically disposed, both converging toward the rear of the jar J depicted to the right in FIG. 1. The flex panels 11 are planar, as manufactured, and flex in response to hot-filling, capping and cooling. Each flex panel is identical in construction to the other.

As illustrated in FIG. 1, the flex panel 11 is vertically elongate and is defined by two opposing upper and lower U-shaped reinforcing rib structures, 19 and 20, respectively. Each rib structure is identical to the other and is characterized by a pair of parallel vertical legs 19a which are connected together by an integral peripheral brow web 19b.

As illustrated in FIG. 3, the brow web 19b has a wall portion 19' that is angulated with respect to the planar vacuum panel 11 and has a region of maximum intrusion extending centrally into the flex panel and end regions of minimum intrusion adjacent the intersections of the brow web 19b and the legs 19a. The region of maximum intrusion of the brow web wall portion 19' intersects the flex panel 11 at an included angle α of about 120°.

As depicted in FIG. 1, each brow web 19b has a portion, opposite the flex panel, which extends peripherally of the jar inwardly adjacent conventional peripheral label bumpers. The ends of the rib structure legs 19a terminate in spaced endwise relation adjacent the transverse median M of the flex panel. The brow web and legs are continuously inwardly concave throughout their entire extents. The U-shaped reinforcing rib structures 19 cooperate to prevent ovalization of the jar without interfering with the desired movement of the planar flex panels 11 in the course of providing the vacuum absorption function during hot-fill processing. The legs 19a provide anti-slip bights at the front and rear vertical edges of the flex panels.

The upper portion of the jar J has a conventional dome shape 23 which terminates in a wide mouth threaded finish 25. When made of PET and used in hot-fill applications, the base 27 of the jar preferably has radially extending ribs (not shown) such as customarily used by Graham in connection with other of its hot-fill containers made of PET. An advantage of this jar structure is that in addition to providing the requisite vacuum absorption, it minimizes the amount-of internal structure that can impede thorough out-scooping of contents.

Another embodiment of the invention which provides enhanced labelability is illustrated in FIGS. 6 through 9. This embodiment is similar in most respects to the previously-described embodiment but has certain structural differences in the flex panel region that provide additional advantages. More specifically, as best seen in the transverse cross section of FIG. 9, the front label panel 113 merges smoothly and continuously into the front vertical margin of each flex panel 111 along an arcuate transition wall 130 having a relatively large radius of curvature, $R_c$, on the order of at least about 0.5 inch. The smooth radiused transition enables a continuous label L, a portion of which is shown in phantom in FIG. 6, to be wrapped onto the front label panel 113 and into frontal vertical margins of each flex panel 111. Desirably, a single, inwardly-concave, vertical rib 150 is provided along the intersection of the rear panel 115 and the rear of each flex panel 111. The rib 150 provides vertical strength, and a bight that facilitates anti-slip gripping.

This embodiment provides the advantages of the previously-discussed embodiment, along with a larger label mounting area because the front label can be wrapped into the flex panel grip area, thereby enabling the front label to occupy one-half or more of the periphery of the jar body. If desired, the rear panel may be labelled, or logos may be molded into the rectangular framed panel regions 115a, 115b, 115c.

Figure 6:
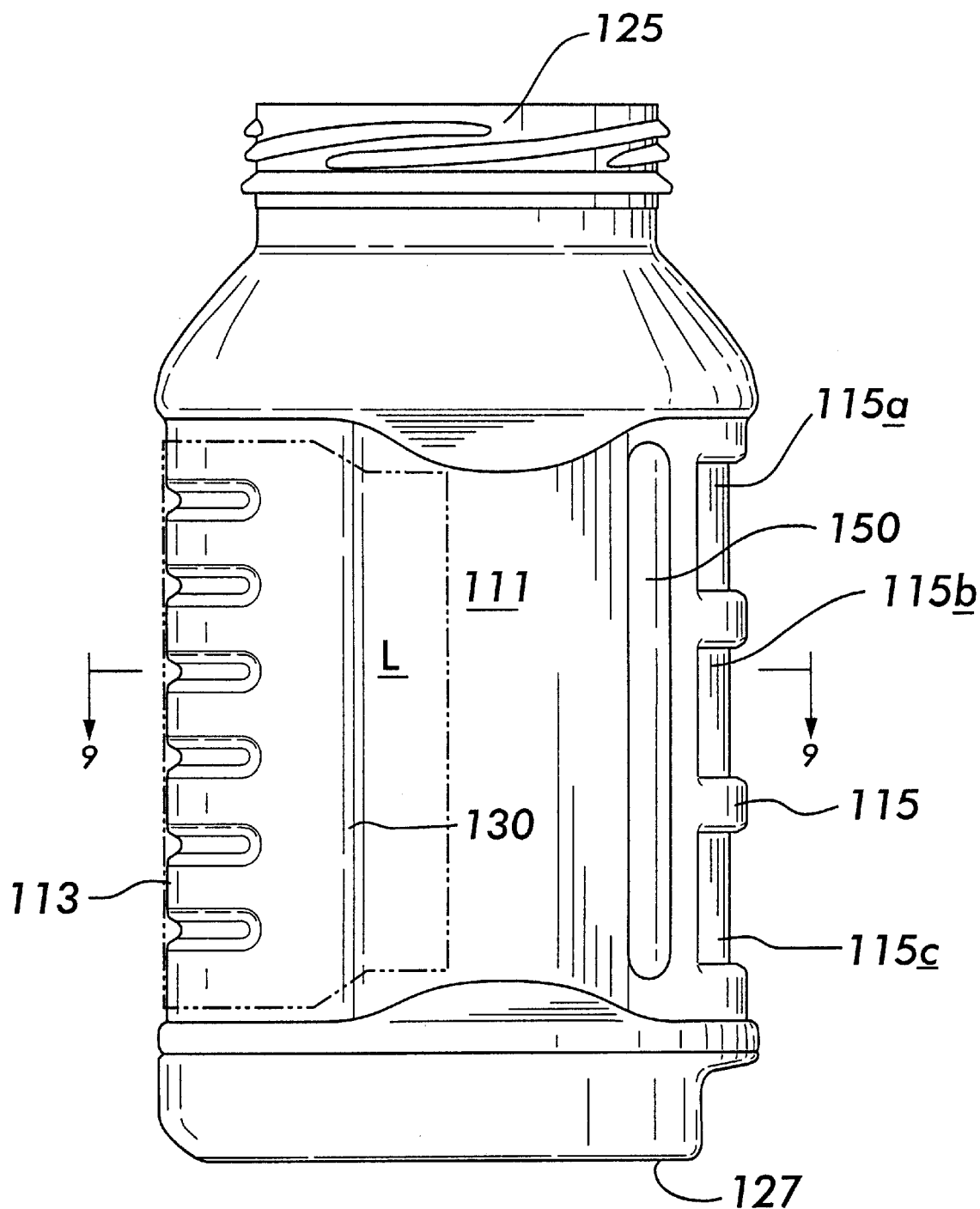
FIG. 6 is side elevational view of another embodiment of the present invention.

Preferably, the planar flex panels of each disclosed embodiment taper chordally from front to rear at a dihedral angle β (FIG. 9) of from about 16° to about 32°, a 24° angle being shown in the illustrated embodiment. The chordal extent of each flex panel preferably corresponds to almost 30 percent of the transverse medial jar body circumference (ie. at least about one-half of the diameter of the container) and should be within a range of about 20 to about 40 percent. The height of each flex panel is about 50 percent greater than the chordal extent. The total labelable area of the jar illustrated in FIG. 6 is about 20 in$^2$. This is about 50 percent of the total peripheral surface of the body portion of the jar. Each flex panel is preferably smooth, although each may include a mottled surface, or may be embossed with decorations or logos. The containers illustrated in FIGS. 1–9 have a volumetric capacity of 24.5 fluid ounces, and are illustrated at full scale.

Preferably, each container is manufactured of PET plastic from an injection-molded preform by a process such as disclosed in Graham's copending application Ser. No. 09/126,170, filed on Jul. 30, 1998, and entitled Wide Mouth Blow Molded Plastic Container, Method of Making Same, and Preform Used Therein, the disclosure of which is incorporated by reference herein. A wide-mouth container manufactured by this process is disclosed in Graham's U.S. Pat. No. 5,887,739, referenced at page 1, the disclosure of which is incorporated by reference herein.

The disclosed container structures can be made by stretch blow-molding from an injection molded preform of any of several well known plastic materials, such as PET, PEN, and the like. Such materials have proven particularly suitable for applications involving hot-fill processing wherein contents are charged at temperatures of greater than 190° F. before the container is capped and allowed to cool to ambient temperatures.

A container structure disclosed in FIGS. 10–14, which is similar to the container of FIGS. 1–5 but with certain modifications, has been found capable of withstanding the rigors of retort processing at temperatures up to 260° F. under super-baric pressure conditions. Such structure is capable of being manufactured of single or multiple layer materials by economical extrusion blow-molding processes, as well known in the art. For example, when an extruded parison having a six (6) layer wall structure of either virgin PP or HDPE, compatible regrind, adhesive, EVOH, adhesive, and virgin PP or HDPE is blow-molded into a 32 fluid ounce container structure (illustrated at approximately twice full scale in FIG. 12) the resulting extrusion blow-molded container is product-opaque; provides acceptable shelf-life for a contained viscous product, such as sauce; is economical to manufacture; and is retortable. The term retortable, as used herein, is intended to mean that a filled and capped container is capable of being heated to temperatures up to 260° F. at pressures up to 45 psi and cooled to ambient temperatures without undergoing distortion that would be commercially-unacceptable to the ultimate consumer.

Figure 11:
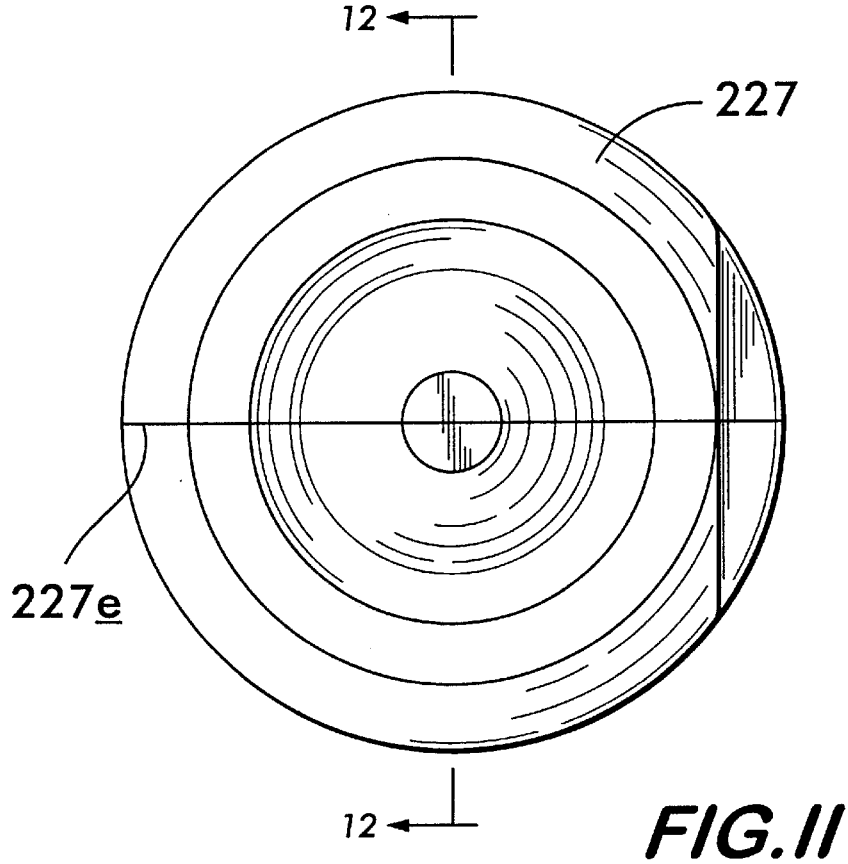
FIG. 11 is a bottom plan view of the container illustrated in FIG. 10.
Figure 10:
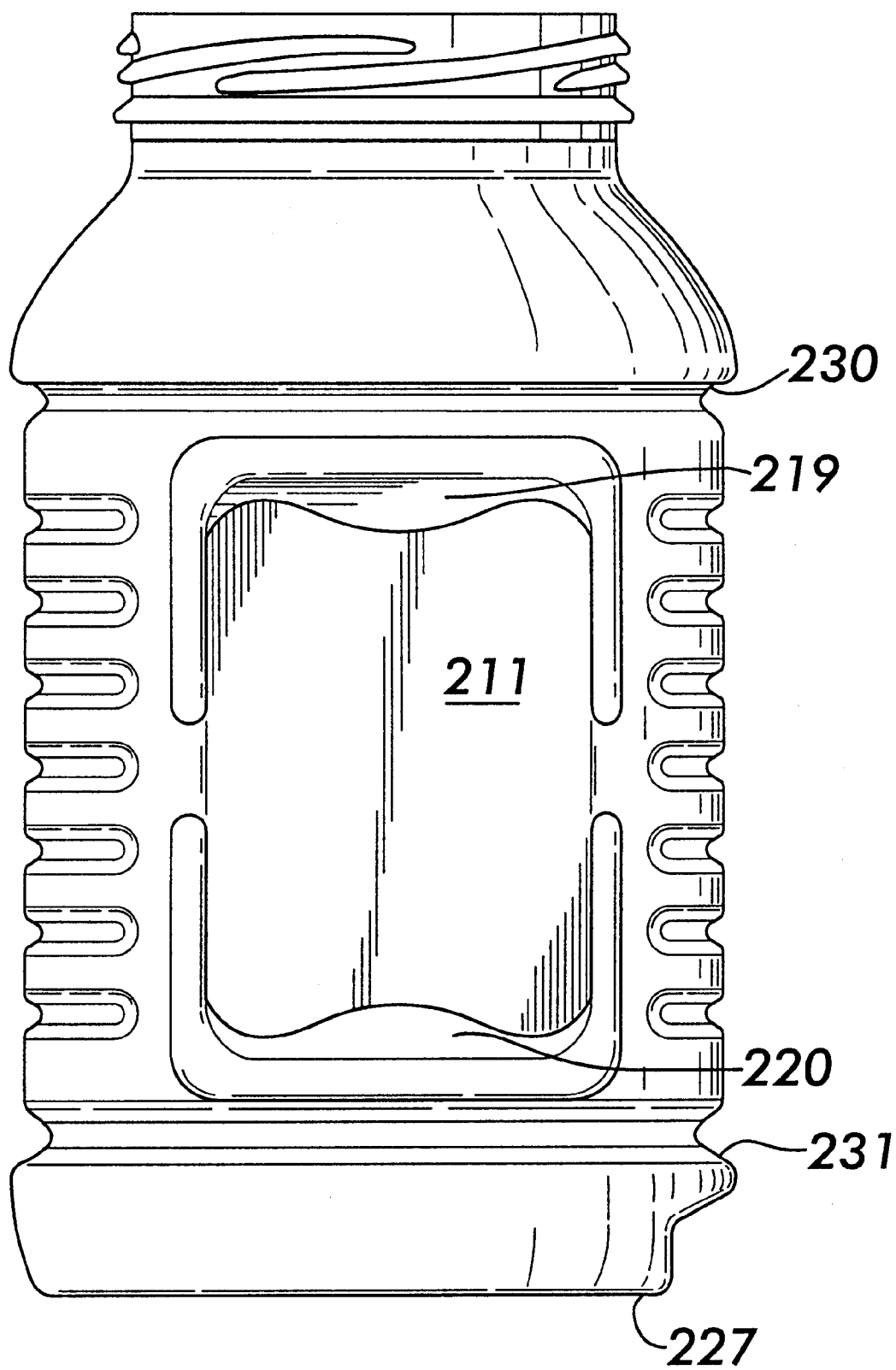
FIG. 10 is a side elevational view of an extrusion blow-molded retortable container; embodying the present invention

According to the present invention, retortability is facilitated by an improved base construction which cooperates with the pair of flex panels to prevent the base from undergoing excessive outward deflection, ie, deflection below the container standing ring. To this end, as best seen in FIG. 10, a base 227 of the illustrated cross-sectional configuration has an annular peripheral standing ring 227a that provides upright support for the container when placed on a flat horizontal surface S. The base 227 has an outer upwardly and radially-inwardly extending annular wall portion 227b that tapers at an angle of 10° from the horizontal surface S. The wall portion 227b merges with an inner upwardly and radially-inwardly extending wall portion 227c that forms an angle of 45° with respect to a horizontal plane parallel to the horizontal plane of the support surface S. The outer and inner wall portions 227b and 227c are connected by an inwardly concave wall portion having a radius of curvature $R_1$. The inner wall portion 227c merges with an inwardly convex wall portion 227d having a radius of curvature $R_2$ which is larger than radius $R_1$. The convex wall portion 227d slants downwardly toward a central circular wall portion 227e coaxial with the container central axis. The central circular wall portion 227e is located at an elevation $H_1$ lower than the elevation $H_2$ of the apogee 227f of the inner tapered wall portion 227c. As seen in FIG. 11, the base 227 has a transverse mold-parting seam 227e which is characteristic of an extrusion blow-molded parison.

Figure 12:
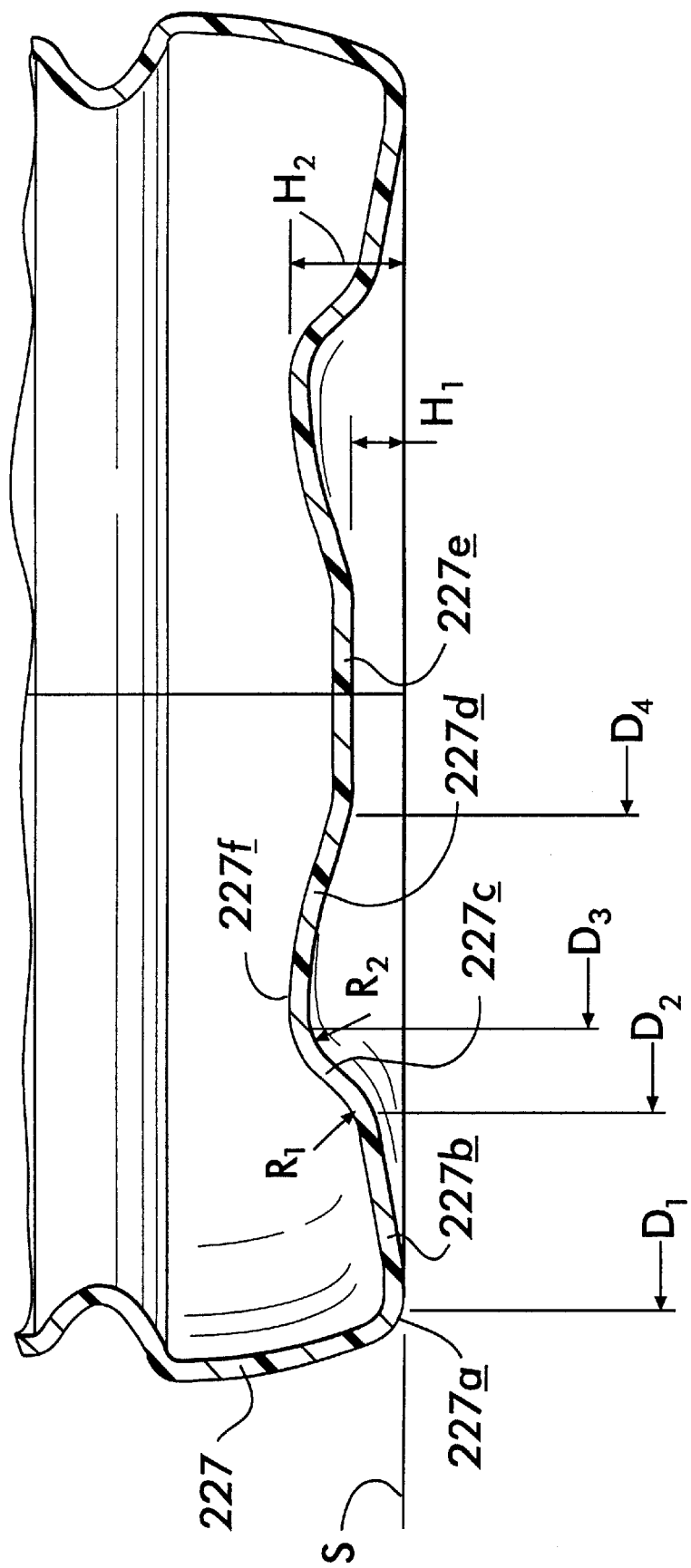
FIG. 12 is an enlarged transverse cross-sectional view taken on line 12—12 of FIG. 11.

Simulated retort tests were conducted on a jar of the configuration illustrated in FIGS. 10–12, which is like the jar of FIGS. 1–6, but which has continuous peripheral outwardly concave reinforcing rings 230 and 231, respectively located above and below the upper and lower brows 219 and 220, respectively. The jar was extrusion blow-molded of a polypropylene multi-layer wall composition noted, supra, and had the base configuration of FIG. 12 and dimensions set forth in Column A in Table I. The jar was hot-filled with water at a temperatures of 150° F.; was provided with a 10 percent headspace; and was capped. To the capped jar, 1.7 fluid ounces of hot water at 150° F. was added under pressure to simulate internal. pressures experienced during retorting.

During the test, it was observed that the flex panels flexed outwardly while the base 227 acted like a diaphragm and deflected downwardly with its central wall portion 227f remaining above the level of the standing ring surface S. It is estimated that the flex panels accommodated about 50 percent of the combined flex panel and base accomodated volumetric expansion of the jar under simulated retort conditions. The combined volumetric expansion was about 80% of the total jar volumetric expansion. The coaction of the base 227 with the pair of flex panels 211 that flexed in preference to the base, and the other disclosed structural features, enabled the jar to be retortable.

Figure 13:
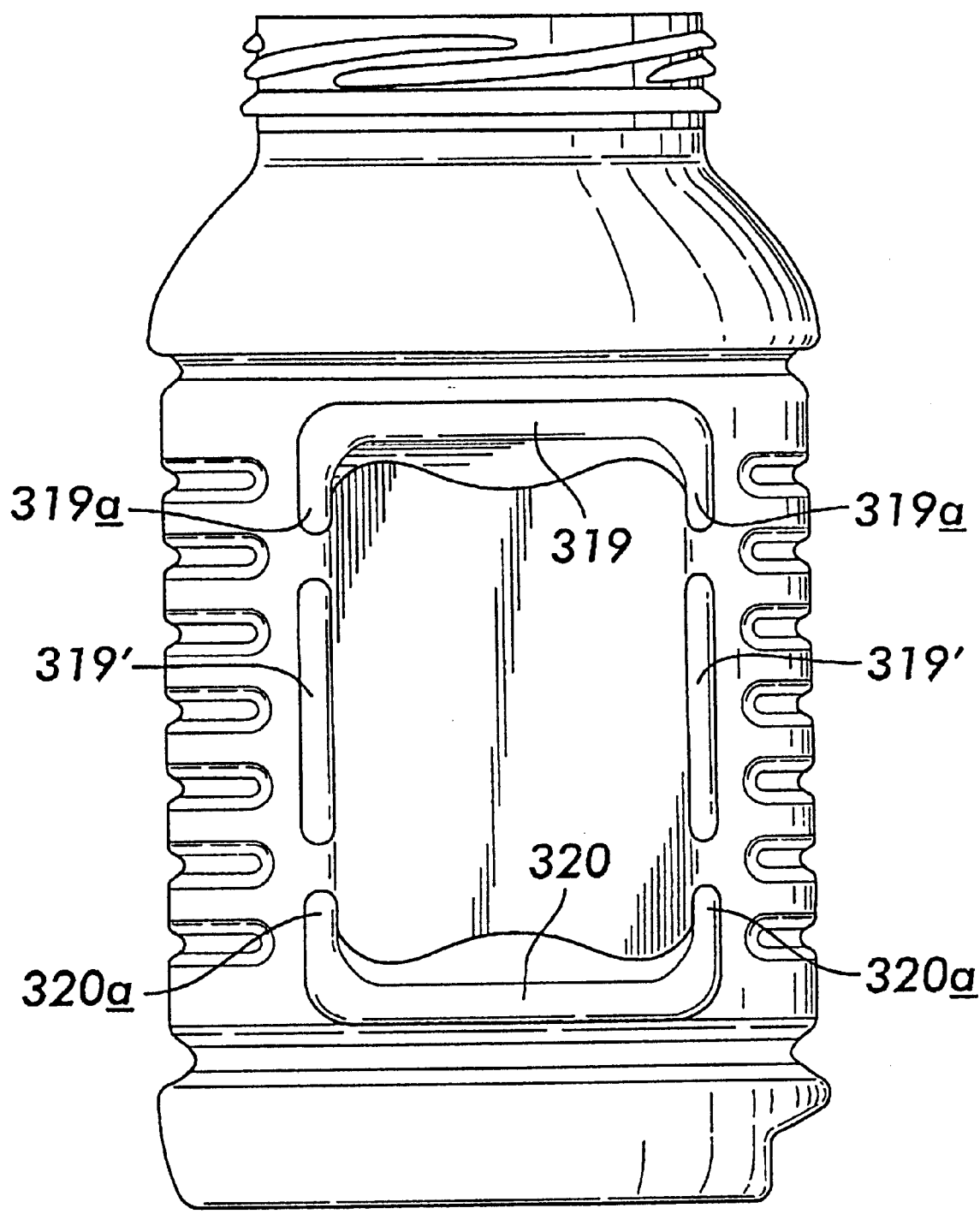
FIG. 13 is a side elevational view of a modified embodiment of the container of FIG. 10.

By way of example, and not by way of limitation, two 32 fluid ounce capacity wide-mouth jars (A and B), both of the sidewall configuration illustrated in FIG. 13, having an overall height of 7 inches, a flex panel length of 3.5 inches and width of 2.0 inches, a maximum outside body diameter of 3.7 inches, and base configurations with the dimensional relations (in inches) in Table I were tested satisfactorily under the simulated retort conditions noted above. Sample B had an outer annular wall angle of 17° instead of 10° as in Sample A.

TABLE I

| Parameter | A | B |
|---|---|---|
| $D_1$ | 3.25 | 3.25 |
| $D_2$ | 2.38 | 2.38 |

TABLE I-continued

| Parameter | A | B |
|---|---|---|
| $D_3$ | 1.73 | 1.73 |
| $D_4$ | 0.39 | 0.39 |
| $H_1$ | 0.13 | .195 |
| $H_2$ | 0.25 | .315 |
| $R_1$ | 5.94 | 7.75 |
| $R_2$ | 6.35 | 6.35 |

While these dimensional relations functioned well for a 32 ounce jar, when scaling-up for larger capacity retortable jars, $D_3$ should be made as large as possible, and $H_1$ should be larger.

If desired, the extrusion blow-molded retortable jar shown in FIG. 10 may have a flex panel frame structure such as shown in FIG. 13. With such frame structure, the upper and lower U-shaped reinforcing ribs 319 and 320 have shorter legs 319a, 320a separated from aligned vertically elongate ribs 319'.

Figure 7:
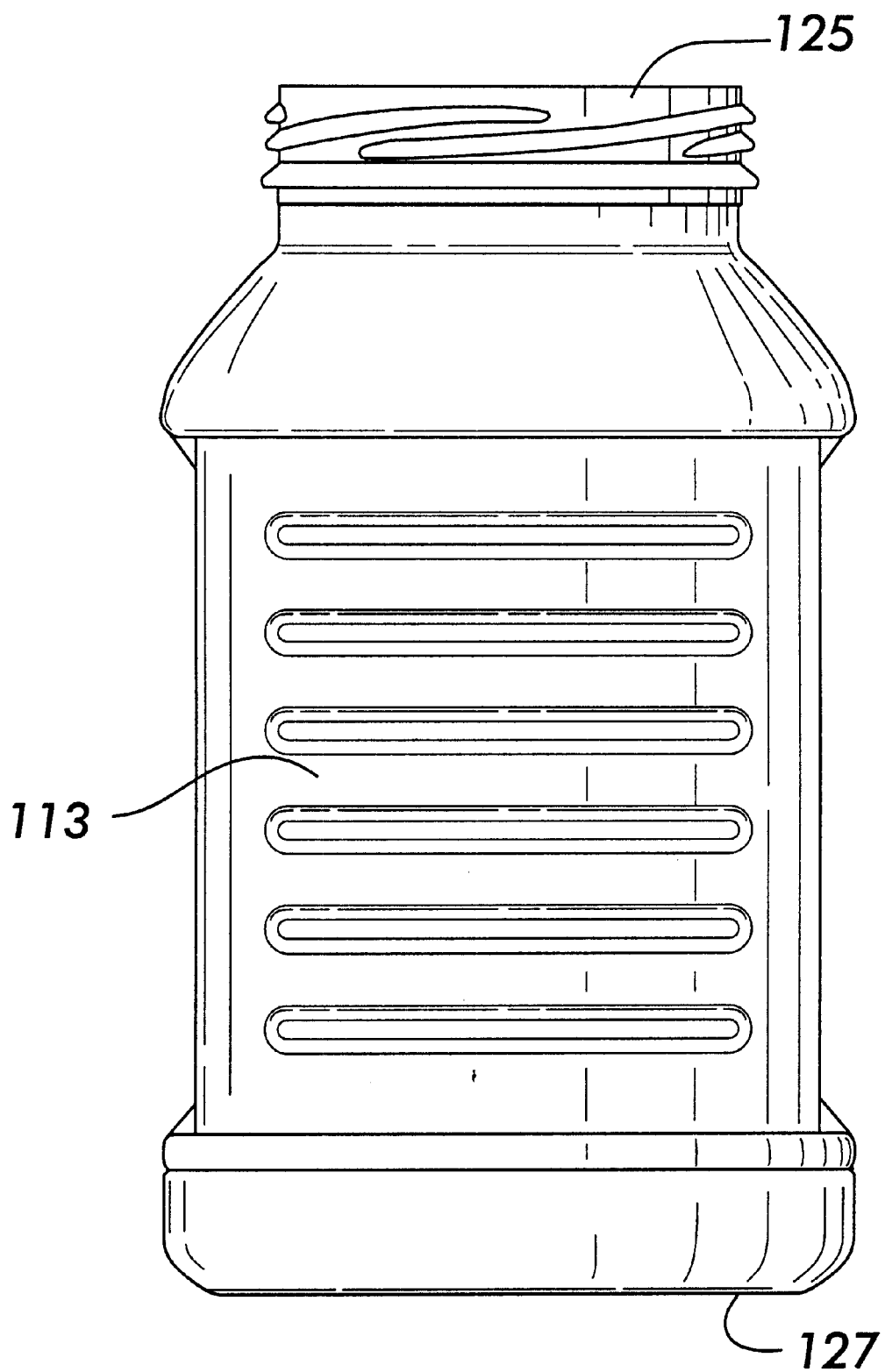
FIG. 7 is a front elevational view of the container illustrated in FIG. 6.
Figure 8:
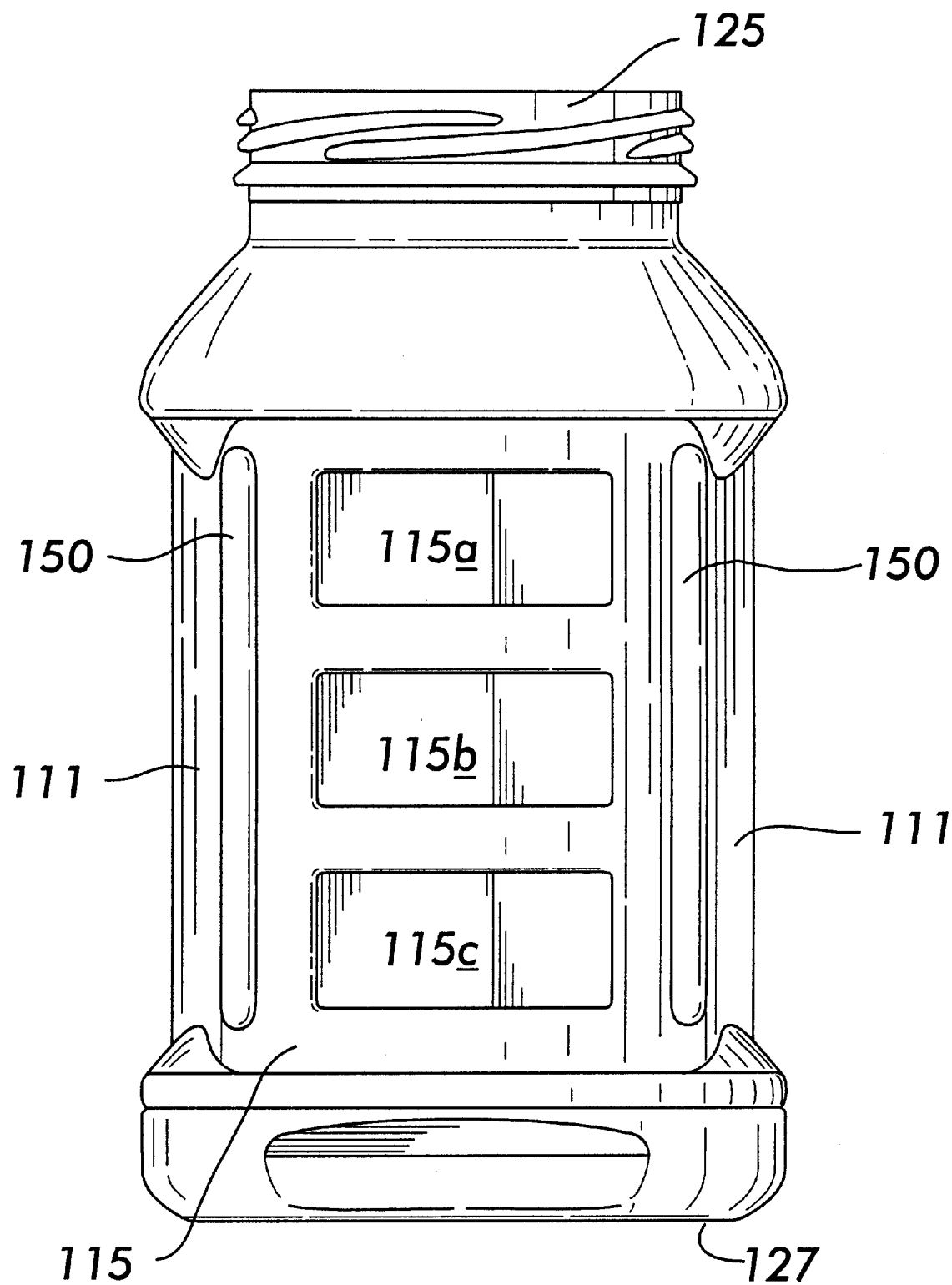
FIG. 8 is a rear elevational view of the container illustrated in FIG. 6.
Figure 9:
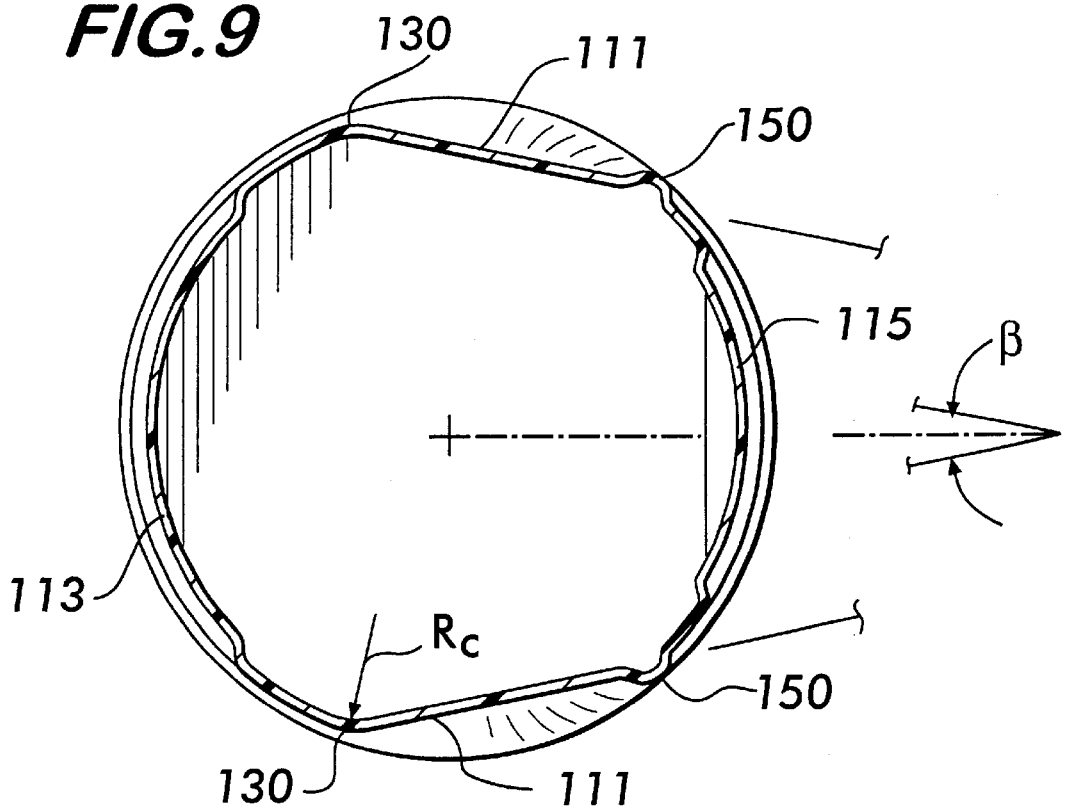
FIG. 9 is a transverse cross-sectional view taken on line 9—9 of FIG. 6.
Figure 14:
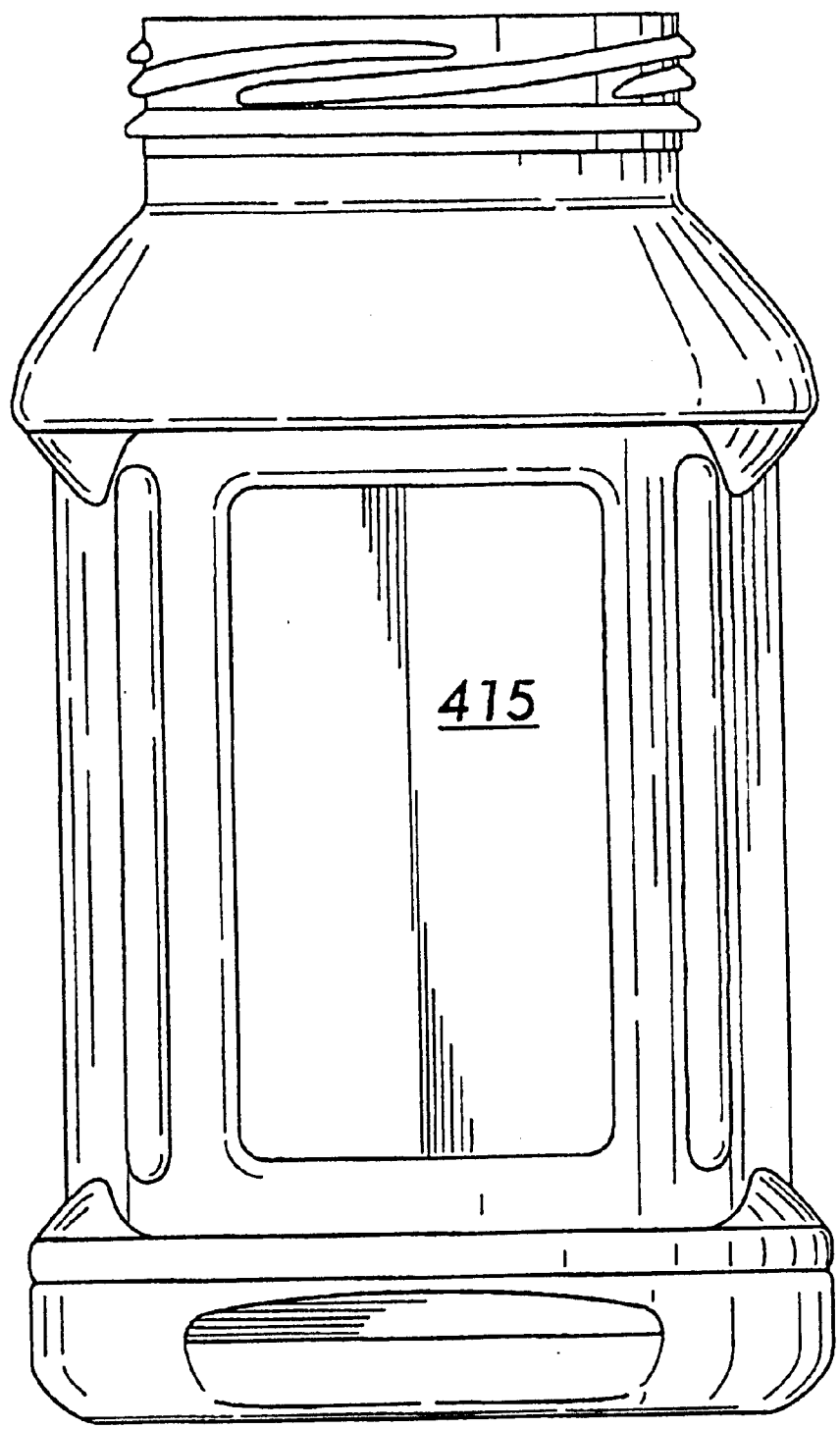
FIG. 14 is a rear elevational view of a further modified embodiment of the container of FIG. 10.

Alternatively, instead of the series of vertically-spaced separately framed panels illustrated at the rear of the retortable jar embodiment illustrated in FIGS. 6–8, a jar may be provided with a single vertically-elongate arcuate rear panel 415, as shown in FIG. 14. The rear panel 415 is particularly suited for extrusion blow-molded retortable jars. The rear arcuate panel 415 can be molded with decorative artwork and logos.

In view of the foregoing it should be apparent that the various embodiments of the present invention overcome the limitations of known prior art containers and achieve the objectives set forth.

While several preferred embodiments have been described in detail, various modifications, alterations and changes may be made without departing from the spirit and scope of the invention as defined in the appended claims.

What is claimed is:

1. In a widemouth blow-molded container having a dome (23) with a finish (25, 125), a base (27, 127, 227), and a body (10) connecting the dome (23) to the base (27, 127, 227), said body (10) having an arcuate front label panel (13, 113) and an arcuate rear panel (15, 115), the improvement comprising:

a pair of flex panels (11, 111, 211) in the body (10) for accommodating internal changes in pressure and volume in the container resulting from heating and cooling of its contents, said flex panels (11, 111, 211) being disposed opposite one another in said container body (11), and each flex panel (11, 111, 211) being planar, as manufactured, said rear label panel (15, 115) being of lesser peripheral extent than said front label panel (13, 113), and said flex panels (11, 111, 211) extending chordally between said front and rear panels (13, 15, 113, 115) and tapering toward one another to subtend a dihedral angle therebetween, whereby the flex panels (11, 111, 211) enhance contents scoopability.

2. A wide-mouth blow-molded container according to claim 1, wherein said dihedral angle subtended by said flex panels (11, 111, 211) is in a range of about 16° to about 32°.

3. A wide-mouth blow-molded container according to claim 2 wherein said dihedral angle is about 24°.

4. A wide-mouth blow-molded container according to claim 1 wherein said pair of flex panels (11, 111, 211)

comprise between about 20 and about 40 percent of the circumferential extent of the body portion of the container.

5. A wide-mouth blow-molded container according to claim 1 wherein said front label panel (113) merges with said flex panels (111) along a radius of curvature sufficiently large as to enable a label to be wrapped continuously across said front label panel (113) and onto said flex panels (111).

6. A wide-mouth blow-molded container according to claim 1 including a vertically elongate rib (150) extending between each flex panel (111) and said rear panel (115).

7. A wide-mouth blow-molded container having a dome with a finish, a base, and a body connecting the dome to the base, said body having an arcuate front label panel and an arcuate rear panel, the improvement comprising:
- a pair of flex panels (11, 211) in the body for accommodating internal changes in pressure and volume in the container resulting from heating and cooling of its contents,
- said flex panels being disposed opposite one another in said container body, and each flex panel being planar, as manufactured,
- each flex panel (11, 211) being defined by an opposed pair of upper and lower U-shaped rib structures (19, 19, 219, 220), each U-shaped rib structure (19, 19, 219, 220) having a pair of vertical legs (19a) connected together by an integral peripheral brow web (19b), said brow web (19b) being angulated with respect to the planar flex panel (11, 211) and having a region of maximum intrusion extending centrally into the flex panel (11, 211) and end regions of minimum intrusion adjacent the intersection of the brow web (19b) and legs (19a),
- whereby the flex panels (11, 211) enhance contents scoopability.

8. A wide-mouth blow-molded container according to claim 7 wherein each brow web (19b) has a portion, opposite the flex panel (11, 211), which extends peripherally of the jar, and said rib structure legs (19a) have ends terminating in spaced relation on opposite sides of a transverse median of the flex panel (11, 211), whereby said rib structure (19, 20, 219, 220) facilitates desired flexure of the flex panel (11, 211), while providing a desirable level of hoop stiffening of the container body.

9. A wide-mouth blow-molded container according to claim 1 wherein said base (227) has a diametrically-extending seam (227e) resulting from having been extrusion blow-molded, said seam (227e) extending medially between said flex panels (211).

10. A wide-mouth blow-molded container according to claim 1 wherein said base (227) has a standing ring (227a) and an upwardly inclined annular portion (227b) inwardly adjacent to said standing ring (227a), an inwardly concave central portion (227e) located above the level of said standing ring (227a), and an inwardly convex portion (227d) connecting said annular and central portions.

11. A hot-fillable blow-molded wide-mouth container having a dome with a finish (125), a base (127), a substantially cylindrical body having an arcuate front label panel (113) and an arcuate rear panel (115) connecting the dome to the base (127), and a pair of flex panels (111) in the body for accommodating internal changes in pressure and volume resulting from heating and cooling of its contents, said flex panels (111) being located opposite one another in said container body, being planar, as manufactured, and extending chordally between said front label panel (113) and said rear panel (115), each flex panel (111) merging with its adjacent front label panel (113) by means of an upright arcuate wall portion (130) having a sufficiently large radius of curvature as to enable a label applied to the front panel (113) to wrap continuously onto at least a frontal marginal portion of said flex panel (111).

12. A container according to claim 11 wherein said arcuate wall portion (130) is smooth and said radius of curvature is at least about 0.5 inch.

13. A container according to claim 11 wherein each flex panel (111) extends chordally at least about one-half the diameter of the container body.

14. A container according to claim 11 including a vertical rib (150) extending between said rear panel (115) and a rear end portion of each flex panel (111).

15. A container according to claim 11 wherein said flex panels (111) extend chordally and subtend a dihedral angle in a range of about 16° to about 32°.

16. A container according to claim 15 wherein said dihedral angle is about 24°.

17. A container according to claim 11 wherein said flex panels (111) and front label panel (113) together provide a label area of at least about one-half of the periphery of the container body.

18. A container according to claim 17 including a continuous label applied onto said front label panel (113) and onto each flex panel (111).

19. A blow-molded wide-mouth container hang a dome (23) with a finish (25, 125), abase (27, 127, 227), a substantially cylindrical body (10) having front label panel (13, 113) and a rear panel of lesser arcuate extent than said front panel (15, 115) connecting the dome (23) to the base (27, 127, 227), and a pair of flex panels (11, 111, 211) disposed opposite one another in the body (10) for accommodating internal changes in pressure and volume resulting from heating and cooling of its contents, said flex panels (11, 111, 211) being planar, as manufactured, and extending chordally with respect to said substantially cylindrical container body to subtend a dihedral angle therebetween to minimize internal structural interference with contents scoopability.

20. A container according to claim 19 wherein said body has at least one rib (150) extending vertically between each flex panel (111) and at least one adjacent arcuate panel portion for at least a substantial portion of the overall height of the flex panel (111).

21. A container according to claim 19 wherein said container body has a surface with a relatively large radius of curvature connecting said front label panel (113) to each flex panel (111) for enabling a front label to be wrapped onto at least front margins of said flex panels (111).

22. A container according to claim 19 wherein said flex panels (11, 111, 211) subtend a dihedral angle in a range of about 16° to about 32°.

23. A container according to claim 19 wherein said flex panels (11, 111, 211) extend chordally for a distance corresponding substantially to at least one-half the diameter of the container body.

24. A container according to claim 19 wherein said base (227) has a standing ring (227a) and an upwardly inclined annular portion (227b) inwardly adjacent to said standing ring (227a), an inwardly concave central portion (227e) located above the level of said standing ring (227a), and an inwardly convex potion (227d) connecting said annular and central portions.

25. An extrusion blow-molded, wide-mouth retortable jar comprising:
- a substantially cylindrical body of retortable plastic material having a font peripheral panel portion and a rear peripheral panel portion of lesser peripheral extent than said front panel portion said body having at least a pair of juxtaposed chordally-extending flex panels disposed between said panel portions (211), said flex panels being planar, as manufactured, and tapering toward one another to subtend a dihedral angle therebetween, a base (227) having a standing ring (227a) and an upwardly inclined annular portion (227b) inwardly of said standing ring (227a), an inwardly concave central portion (227e) located above the level of said standing ring (227a), and an inwardly convex portion (227d) connecting said annular and central portions.

26. A jar according to claim 25 wherein said annular portion (227b) includes an outer portion inclined upwardly at a first acute angle and an inner portion inclined upwardly at a second acute angle greater than said first acute angle.

27. A jar according to claim 26 wherein said first acute angle is in a range of about 10° to about 17°, and said second acute angle is on the order of 45°, both relative to parallel planes. passing through said standing ring (227a).

28. A jar according to claim 26 wherein said outer portion is connected to said inner portion by a first radius of curvature and said inner portion is connected to said inwardly convex portion by a second radius of curvature of about the same order of magnitude as said first radius of curvature.

29. A jar according to claim 26 wherein said inwardly convex and central portions combined compose about one-half the area of the base (227) inside said standing ring (227a).

30. A jar according to claim 26 wherein said central portion (227e) is located above the level of said standing ring (227a) so as to remain above a plane passing therethrough under conventional retort processing conditions.

* * * * *

UNITED STATES PATENT AND TRADEMARK OFFICE
CERTIFICATE OF CORRECTION

PATENT NO. : 6,439,413 B1
DATED : August 27, 2002
INVENTOR(S) : Prevot et al.

It is certified that error appears in the above-identified patent and that said Letters Patent is hereby corrected as shown below:

Column 6,
Line 51, "body (11)" should read -- body (10) --

Column 7,
Lines 23 and 24, "(19, 19, 219, 220)" should read -- (19, 20, 219, 220) --

Column 8,
Line 26, "hang" should read -- having --
Line 61, "potion" should read -- portion --
Line 66, "font" should read -- front --

Signed and Sealed this

Fourth Day of February, 2003

JAMES E. ROGAN
*Director of the United States Patent and Trademark Office*